(12) United States Patent
Hollmann et al.

(10) Patent No.: US 6,366,673 B1
(45) Date of Patent: Apr. 2, 2002

(54) METHOD AND DEVICE FOR EXECUTING A DECRYPTING MECHANISM THROUGH CALCULATING A STANDARDIZED MODULAR EXPONENTIATION FOR THWARTING TIMING ATTACKS

(75) Inventors: Hendrik D. L. Hollmann; Marten E. Van Dijk; Petrus J. Lenoir, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/153,778

(22) Filed: Sep. 15, 1998

(30) Foreign Application Priority Data

Sep. 16, 1997 (EP) .............................. 97202855

(51) Int. Cl.[7] .................................. H04K 1/00
(52) U.S. Cl. ......................... 380/28; 380/285; 380/44; 380/30
(58) Field of Search ................................ 380/281, 282, 380/283, 284, 285, 44, 28, 30, 262, 265

(56) References Cited

U.S. PATENT DOCUMENTS

| | | | | |
|---|---|---|---|---|
| 5,261,001 A | * | 11/1993 | Dariel et al. ................. | 380/30 |
| 5,724,279 A | * | 3/1998 | Benaloh ..................... | 364/746 |
| 6,085,210 A | * | 7/2000 | Buer ......................... | 708/491 |
| 6,088,800 A | * | 7/2000 | Jones et al. ................. | 713/189 |
| 6,151,393 A | * | 11/2000 | Jeong ........................ | 380/265 |
| 6,182,104 B1 | * | 1/2001 | Foster et al. ................ | 708/501 |

OTHER PUBLICATIONS

"Fast Implementations of RSA Cryptography" by M. Shand et al., IEEE Proc. 11th Symposium on Computer Arithmetic, pp. 252–259.

* cited by examiner

Primary Examiner—Albert Decady
Assistant Examiner—Paul E. Callahan
(74) Attorney, Agent, or Firm—Daniel J. Piotrowski

(57) ABSTRACT

An encrypting exponentiation modulo M is effected by a modular multiplication X*YmodM, where M is a temporally steady but instance-wise non-uniform modulus. The method involves an iterative series of steps. Each step executes one or two first multiplications to produce a first result, and a trim-down reduction of the size of the first result by one or more second multiplications to produce a second result. The method furthermore takes a distinctive measure for keeping the final result of each step below a predetermined multiplicity of the modulus. In particular, the method postpones substantially any subtraction of the modulus as pertaining to the measure to a terminal phase of the modular exponentiation. This is possible through choosing in an appropriate manner one or more parameters figuring in the method. This further maintains overall temporal performance.

5 Claims, 2 Drawing Sheets

METHOD AND DEVICE FOR EXECUTING A DECRYPTING MECHANISM THROUGH CALCULATING A STANDARDIZED MODULAR EXPONENTIATION FOR THWARTING TIMING ATTACKS

BACKGROUND OF THE INVENTION

The invention relates to a method according to the preamble of Claim 1. Encrypting by executing a standardized modular exponentiation is used in the environment of a smart card and elsewhere, such as for supporting financial operations, through blocking opportunity for falsifying the control or contents of such operations. Encryption can be expressed as $y=<x^e>_M$, wherein x is a message, e is an encryption key, and M a modulus. Likewise, decryption is effected as $D(y)=<y^d>_M$, wherein d is the decryption key, and retrieving x from D is straightforward. For a particular device, the values of M and e are known and fixed, the content of x to be encrypted is naturally unknown and variable, and the value of d is fixed but unknown. For certain operations, such as the providing of an encoded signature, the first encoding also operates with a secret key along similar lines. For the present description, such encoding is also called "decrypting". Now, the decrypting is effected digit-wise. For each digit of D, one or two first multiplications X*Y mod M produce a first result. The attaining of such first result is followed by an addition. After attaining a second result, the next digit of D is processed. Prior technology has kept the size of the second result down by, in operation, subtracting an appropriate multiplicity (zero, one, or more) of the quantity M, because the register width of available hardware is adapted to the digit length, that is generally much less than the size of the overall quantities used in the multiplication.

It has been found that the sequential pattern of the above multiplicity may depend on the values of X, Y, and M. Further, the use of temporal statistics on a great number of mutually unrelated decryption operations with arbitrary messages allows to derive a value for d. This renders the protection by the encryption illusory. Therefore, a need exists to mask these statistical variations by some additional affecting of the calculation procedure.

SUMMARY TO THE INVENTION

In consequence, amongst other things, it is an object of the present invention to suppress the relation between the value of the decryption key and the temporal structure of the calculating steps, through a masking mechanism that does not appreciably lengthen the calculations, nor would necessitate inordinate hardware facilities. Now therefore, according to one of its aspects, the invention is characterized by the characterizing part of Claim 1. In particular, the inventors have recognized that present day microcontrollers, even those that are used in the constraining environment of a smart card, can allow the use of longer storage registers than before, and in particular, a few bits longer than the digits used in the calculation. Such registers would provide the extra freedom that the present invention is in need of.

Advantageously, the procedure executes the exponentiation along the Quisquater or Barrett prescriptions. These are methods commonly in use, and the amending of their prosecution for adhering to the invention is minimal. The pattern of the calculation procedure no longer depends on the decryption key. This takes away any method for so deciphering the value of the decrypting key.

The invention also relates to a device arranged to implement the method of the invention. Further advantageous aspects of the invention are recited in dependent Claims.

BRIEF DESCRIPTION OF THE DRAWING

These and further aspects and advantages of the invention will be discussed more in detail hereinafter with reference to the disclosure of preferred embodiments, articular with reference to the appended Figures that show.

DETAILED DISCLOSURE OF PREFERRED EMBODIMENTS

Figure 1:
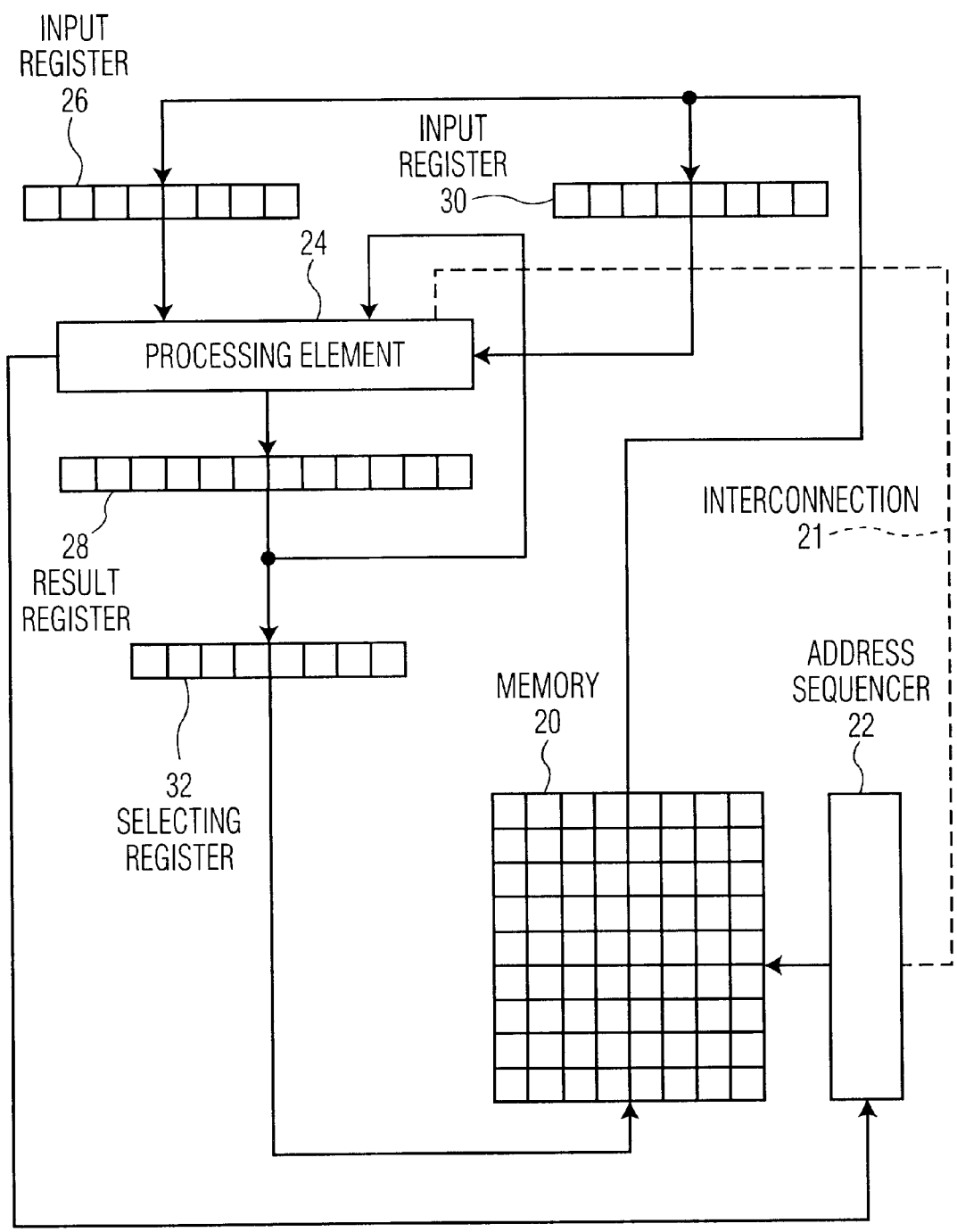
FIG. 1, a hardware block diagram of the invention.

The so-called "timing attack" follows the recognizing that for various implementations of the modular exponentiation, the computation times of successive encryptions will vary slightly from one message to another. With knowledge of the implementation, precise measuring of computation times for a large number of messages may lead to obtaining the secret key. Experiments have demonstrated that such is feasible indeed. To understand the nature of the attack and possible countermeasures, we give the main elements of the RSA encryption/decryption method and some common implementations.

Messages are encoded by integers x in a range 0<x<M, for some fixed number M. For integers y, z, and N, y≡z mod N indicates that N divides y−z. Also, $<y>_N$ denotes the remainder of y after division by N, that is the unique number r with 0≤r<N such that y=r+q.N for some integer q. If α is a real number, then $\lfloor \alpha \rfloor$ denotes the largest integer k≤α (truncating).

The RSA scheme is based on the difficulty to factor large numbers, as follows. Two communicating parties may agree on a number M, which typically is an (m=512)-bit number, and is the product M=p.q of two prime numbers p and q that are kept secret, and each have approximately m/2 bits. The parties also agree on a private key number d and a public key number e. The numbers M and e are made public, while the number d may be put into a tamper-resistant module of a smart card that is given to the user party. The private key d must remain unknown to the user. Instructions to change the account of the user are sent in encrypted form to the smart card which then uses the private key d to decrypt the instructions to amend the account. The smart card is considered "hacked" if a user obtains the private key d, and might so for instance instruct the card to increase the account. The numbers d and e must satisfy d.e≡1 mod lcm(p−1,q−1), where lcm(a,b) is the least common multiple of a and b, the smallest positive integer divisible by both a and b. Given a modulus N and an integer c for which gcd(c,N)=1, that is, with c and N relatively prime (without a common divisor), it is easy to compute a number c' such that c.c'≡1 mod N. To transfer a secret message x, 0<x<M, to a user, the number $E(x)=<x^e>_M$ is sent instead. From an encoded message y, the card computes $D(y)=<y^d>_M$. Note that if $y=<x^e>_M$, then $D(y)\equiv(x^e)^d\equiv x^{d.e}\equiv x$ mod M. This equality follows from the fact that $y^f\equiv y$ mod M holds for all y if and only if f≡1 mod lcm(p−1,q−1).

The security of the RSA scheme depends on the difficulty to recover $<x>_M$ from $<x^e>_M$ without knowing the private key d. For arbitrary x this problem appears as difficult as inverting e modulo lcm(p−1,q−1), i.e. finding d without knowing p and q, which is as difficult as factoring M.

Modular Exponentiation

The main operation in an RSA scheme is modular exponentiation, $y \to x = \langle y^d \rangle_M$. Often, this operation is implemented as follows. Write $$d = \sum_{i=0}^{m-1} d_i 2^i,$$

where $d_i \in \{0,1\}$, the binary representation of d. Put $x^{(m)}=1$, and compute $x^{(m-1)}, x^{(m-2)}, \ldots, x^{(1)}, x^{(0)}$ recursively as $$x^{(k)} = \langle\langle (x^{(k+1)})^2 \rangle_M \cdot y^{d_k} \rangle_M. \quad (1)$$

We now have $x = x^{(0)}$. The original message x is computed from the received encrypted message y in m steps, each step consisting of a squaring modulo M followed by a multiplication modulo M if the corresponding key-bit is 1. From (1) we see that exponentiation is done through repeated modular multiplications, that is, the operation $$(x,y) \to z = \langle x \cdot y \rangle_M. \quad (2)$$

Most systems simplify this multiplication by grouping m bits of the number y into digits of b bits, wherein b may arbitrarily range from b=1 to b=32. Thus, y is written as $$y = \sum_{i=0}^{\lfloor n/b \rfloor - 1} y_i 2^{bi},$$

where $0 \leq y_i < 2^b$. Formula (2) is calculated recursively by putting $z_{\lfloor n/b \rfloor} = 0$, and computing $z_{\lfloor n/b \rfloor}, \ldots, z_0$ successively by $$z_i = \langle\langle x \cdot y_i \rangle_M + z_{i+1} 2^b \rangle_M. \quad (3)$$

It is not attractive to implement the operation $$(x, y_i) \to \langle x \cdot y_i \rangle_M \quad (4)$$

"as is", for the following reason. The number $u = x \cdot y_i$ is an (m+b)-bit number. The number $\langle u \rangle_M$ is obtained as $$(u)_M = u - \left\lfloor \frac{u}{M} \right\rfloor \cdot M. \quad (5)$$

This computation needs a multiplication and a division of u by the m-bit number M. However, normal division of large numbers is much more complex than multiplication. Therefore, various methods have replaced the direct implementation of (5) by implementations that use a few (typically, two or three) multiplications, possibly followed by a few (typically, one or two) subtractions of M.

Several methods use special representations for numbers modulo M. This needs converting from ordinary representation to special representation and back. The converting is done only once at the start and once at the end of a modular exponentiation. In between, many modular multiplications are computed, so the extra overhead is negligible. We will give two such methods in detail.

The additional subtractions that sometimes must follow a modular multiplication make timing attacks feasible. In such attack, the smart card must decrypt a large number of messages, and a statistical analysis of the decryption times enables an attacker to recover the bits of the private key d. The invention adapts known methods for modular multiplication so that these extra subtractions are no longer needed.

Two Methods for Modular Multiplication

In the Quisquater method, all reduction is done modulo some multiple N of M, where the first p most significant bits of N are all equal to 1, that is, the modulus N is an n-bit number for which $$2^n - 2^{n-p} \leq N < 2^n \quad (7)$$

At the end of the exponentiation modulo N, the result is reduced modulo M to get the desired answer. To compute a modular multiplication $$(x,y) \to z = \langle x \cdot y \rangle_N, \quad (8)$$

the n-bit number y is partitioned into blocks of $b \leq p-1$ bits and z is found recursively by multiplying $x \cdot y_i$ similarly to (3). Expression (5) is replaced by the "Quisquater-reduction":

$$Q(u) = u - \left\lfloor \frac{u}{2^n} \right\rfloor \cdot N. \quad (9)$$

Remark 1: Note that $Q(u) \equiv \langle u \rangle_N \mod N$. Only, we cannot guarantee that $Q(u) < N$. For large u the number $Q(u)$ can indeed be bigger than N. However, we can show that $Q(u) < \theta N$ if $u < 2^p(\theta - 1)N$, so the Quisquater-reduction is "almost as good" as the required residue-operation.

Now, the result z of the multiplication is computed recursively by putting $Z_{\lfloor n/b \rfloor}^* = 0$ and $$Z_i^* = Q(x \cdot y_i + z_{i+1}^* \cdot 2^b) \quad (10)$$

Note that $z^* := Z_0^* \equiv x \cdot y \mod N$ holds. We may show that for $b \leq p-1$ and $0 \leq x < N$, we have $0 < Z_i^* < 3N$ for all i. So the result $z = \langle x \cdot y \rangle_N$ is obtained from $z^*$ by subtracting N at most twice. We will prove this later.

The Barrett method uses the given modulus M itself. The modular reduction $\langle x \rangle_M$ of a number x is estimated by $$B(x) = x - \left\lfloor \left\lfloor \frac{x}{b^{n-1}} \right\rfloor \cdot \frac{R}{b^{n+1}} \right\rfloor \cdot M, \quad (11)$$

where $$R = \left\lfloor \frac{b^{2n}}{M} \right\rfloor$$

and n is chosen such that $b^{n-1} \leq M < b^n$. The product $z = xy$ of two numbers x and y is calculated as follows:

(i) $z_0 = xy$;

(ii) $z = z_0^* = B(z_0)$.

We will prove that if $0 \leq x, y < M$, the result z obeys $0 \leq z < 3M$, so that we need at most two extra reductions to obtain $\langle xy \rangle_M$. For $b \geq 3$ the computation of $B(z_0)$ may be simplified. Let indeed $$u = \left\lfloor \left\lfloor \frac{x}{b^{n-1}} \right\rfloor \cdot \frac{R}{b^{n+1}} \right\rfloor \cdot M$$

so that $z = x - u$. By the above remark, $z < 3M < b^{n+1}$. From $z \equiv x - u \mod b^{n+1}$, we conclude that $$z = \langle z \rangle_b^{n+1} = \begin{cases} \langle x \rangle_{b^{n+1}} - \langle u \rangle_{b^{n+1}}, & \text{if this expression is } \geq 0 \\ b^{n+1} + \langle x \rangle_{b^{n+1}} - \langle u \rangle_{b^{n+1}} & \text{otherwise.} \end{cases}$$

Improvements of the Algorithms for Modular Multiplication

Timing attacks are feasible because the modular multiplication may or may not require additional subtractions of the modulus. However, these additional reductions may be avoided: by a slight change of the original assumptions, we can work throughout the modular exponentiation with the unreduced results, and do any reduction only at the very end of the modular exponentiation. To show that this works, we will provide upper bounds on the intermediate results of our modular multiplications for each algorithm.

For the modified Quisquater method we assume that we have a modulus M for which $2^{m-1} \leq M < 2^m$. Now, we compute a number N=cM for which holds $2^n - 2^{n-p} \leq N < 2^n$. This is always possible if $n \geq m+p$. Because the admissible interval for N is $2^{n-p} \geq 2^m > M$, some multiple of M must fall within this interval. All intermediate computations are done modulo N, instead of modulo M, with a reduction modulo M at the very end. N is a multiple of M, so no information is lost.

As before, to get the result z=xy of a modular multiplication of x and $$y = \sum_{i=0}^{\lfloor n/b \rfloor - 1} y_i 2^{bi},$$

we use the following:

(i) $Z_{\lfloor n/b \rfloor} = 0$;
(ii) For $i = \lfloor n/b \rfloor - 1, \lfloor n/b \rfloor - 2, \ldots, 0$, we compute
$z_i = x \cdot y_i + Z_{i+1} * 2^b$ and $Z_i^* = Q(z_i)$;
(iii) $z = z_0^*$.

We will need the following facts about this algorithm.
Proposition 3.3. If $0 \leq x < \alpha N$ and $2^p + \alpha 2^b \leq (2^p - 2^b)\theta$, then for all i $$0 \leq z_i^* < \theta N \qquad (12).$$

Proof: If $0 < x < \alpha N$, $N \leq 2^n - 2^{n-p}$, $0 \leq y_i < 2^b$, and $0 \leq Z_{i+1}^* < \theta M$, then $$z_i < \alpha N 2^b + \theta N 2^b = (\alpha + \theta) N 2^b,$$

hence $$(Q(z_i) - \langle z_i \rangle_N)/N = \left\lfloor \frac{z_i}{N} \right\rfloor - \left\lfloor \frac{z_i}{2^n} \right\rfloor < 1 + \frac{z_i}{N} - \frac{zi}{2n}$$

$$= 1 + z_i(2^n - N)/N 2^n$$
$$< 1 + (\alpha + \theta) N 2^b 2^{n-p}/N 2^n$$
$$= 1 + (\alpha + \theta) 2^{b-p} \leq \theta.$$

Now $Q(z_i) \equiv z_i \equiv \langle z_i \rangle_N$, hence the number $(Q(z_i) - \langle z_i \rangle_N)/N$ is an integer; since according to the above this number is $< \theta$, we conclude that $(Q(z_i) - \langle z_i \rangle_N)/N \leq \theta - 1$. Since also $\langle z_i \rangle_N < N$ by definition, it follows that: $z_i^* = Q(z_i) < \theta N$.

Obviously, condition (12) can only be satisfied if $p \geq b+1$. Further, if $p = b+1$, then (12) is equivalent to the condition $\theta \geq \alpha + 2$. So if $\alpha = 1$, then the number z resulting from the above algorithm always satisfies $0 \leq z \leq 3N$, so that at most two further reductions are required, a result used hereabove.

If all results of modular multiplications must be less than $\alpha N$, we need $\theta = \alpha$, and it is necessary and sufficient that $$p \geq b+2, \quad \theta = \alpha \geq 2.$$

So, provided that p=b+2, during modular exponentiation we may forego additional reductions after each modular multiplication and still guarantee that all results are non-negative and $\leq 2N$. The result of the modular exponentiation is obtained by at most one reduction at the very end, plus a reduction $Z \to \langle z \rangle_M$.

The Barrett method can be modified in a way similar to Quisquater's. Assume that modulus M obeys $b^{n-1} \leq M < b^n$. To compute the result z=xy of a modular multiplication of x and $$y = \sum_{i=0}^{\lfloor n/r \rfloor - 1} y_i b^{ri}$$

in b-ary notation, we use the following. Define $$B_{k,l}(u) = u - \left\lfloor \left\lfloor \frac{u}{b^k} \right\rfloor \cdot \left\lfloor \frac{b^{k+l}}{M} \right\rfloor \middle/ b^l \right\rfloor M.$$

(i) $z^{\lfloor n/r \rfloor *} = 0$
(ii) For $i = \lfloor n/r \rfloor - 1, \ldots, 0$, we compute $$z_i = x \cdot y_i + Z_{i+1}^* \cdot b^r$$

and $$z_i^* = B_{k,l}(z_i);$$

(iii) $z = z_0^*$.
Proposition 3.4: If $0 \leq x < \alpha M$, $0 \leq Z_{i+1} \leq \beta M$, and $$k=n-1, \ l=r+1, \ 2+\alpha+\beta \leq \theta, \qquad (13)$$

or $$k=n, \ l=r+1, \ \alpha=\beta=\theta, \ \theta \geq \max(2b/(b-2),(1+b)b^2/(b^2-2)), \qquad (14)$$

or, for example, $$b=4, \ k=n-1, \ l=r+2, \ \alpha=\beta=\theta, \ \theta \geq 3, \qquad (15)$$

or $$b=4, \ k=n-2, \ l=r+4, \ \alpha=\beta\theta, \ \theta \geq 2, \qquad (16)$$

then $0 \leq z_i^* < \theta M$.
Proof: If $0 \leq x < \alpha M$, $b^{n-1} \leq M < b^n$, $0 \leq y_i < b^r$, and $0 \leq Z_{i+1}^* \leq \beta M$, then $$z_i < \alpha M b^r + \beta M b^r = (\alpha + \beta) M b^r,$$

hence $$(B(z_i) - \langle z_i \rangle_M)/M = \left\lfloor \frac{z_i}{M} \right\rfloor - \left\lfloor \left\lfloor \frac{z_i}{b^k} \right\rfloor \left\lfloor \frac{b^{k+l}}{M} \right\rfloor \middle/ b^l \right\rfloor < 1 +$$

$$\frac{z_i}{M} - \left\lfloor \frac{z_i}{b^k} \right\rfloor \left\lfloor \frac{b^{k+l}}{M} \right\rfloor \middle/ b^l < 1 +$$

$$\frac{z_i}{M} - \left( \frac{z_i}{b^k} - 1 \right) \left( \frac{b^{k+l}}{M} - 1 \right) \middle/ b^l$$

-continued $$= 1 + \frac{b_k}{M} + \frac{z_i}{b^{k+l}} - \frac{1}{b^l} < 1 +$$

$$\frac{b_k}{M} + \frac{(\alpha+\beta)/Mb^r}{b^{k+l}}$$

$$\leq 1 + \max(b^{k-n+1} + (\alpha+\beta)b^{n-1+r-k-1}, b^{k-n} + (\alpha+\beta)b^{n+r-k-1}).$$

The last inequality follows from $b^{n-1} \leq M < b^n$, and from the fact that the convex function $a/M + bM$, $a \geq 0$ becomes maximum when M is either minimal or maximal. An interesting result needs $k+1 \geq n+r$. To limit the size of the necessary multiplication to compute $B_{k,l}$, k should be as large and k+l as small as possible. Each additional condition (13), (14), (15), and (16) then implies this last expression to be at most equal to θ.

Now $B(z_i) = z_i = <z_i > M \mod M$, hence $(B(z_i) - <z_i>_N)/N$ is an integer; since this number is less than θ, it follows that $(B(z_i) - <z_i>_M)/M \leq \theta-1$. Since also $<Z_i>_M < M$ by definition, we conclude that $z_i^* = B(z_i) < \theta M$.

The above is used in several ways. One way takes r=n, k=n−1, and l=n+1. Then we compute $z = B_{k,l}(xy) = B(xy)$ in one step, so θ=0. Proposition 3.4 states that if x<M, then z<3M. This proves the earlier claim.

Alternatively, b is taken small, typically b=4, and k=n, l=r+1, and α=β=θ. Since $(1+b)b^2/(b^2-2) \geq 2b/(b-2)$ for $b \geq 3$, the result in Proposition 3.4 states that all intermediate results will be <θM if $\theta \geq (1+b)b^2/(b^2-2)$ and $b \geq 3$, that is, <6M when b=4. Similarly, for b=4, if we let k=n−2, l=r+4, α=β=θ=2, then all intermediate results will be <2M and if we let k=n−1, l=r+2, α=β=θ=3, then all intermediate results will be <3M. Therefore, the modular exponentiation may forego additional reductions after each modular multiplication and still guarantee that all intermediate results are non-negative of size at most θM. Here θ is a number between 2 to 6, depending on the choice for k and l. The final result is obtained via only a few reductions at the very end of the modular exponentiation.

By itself, a well-known third method for implementing modular exponentiation is due to Montgomery. An improvement to this particular method has been disclosed in M. Shand & J. Vuillemin, Fast Implementation of RSA Cryptography in Proc. 11th Symposion on Computer Arithmetic, IEEE 1993, p.252–259. In this reference, certain normalizing proposals to the Montgomery method are done to obviate the need for repeated normalizations after intermediate processing steps. The object of the reference was to increase the overall speed of the processing. The present invention on the other hand, has shown that timing attacks may be thwarted by initial operand conversions plus some minimal hardware facilities for non-Montgomery algorithms. Such timing attacks have not figured in the setting of the above citation. Furthermore, the Quisquater and Barrett methodologies have been herein disclosed expressly by way of non-limiting embodiments only.

FIG. 1 is a hardware block diagram of a device according to the invention. The operand memory 20 is as shown based on the modular storage of 8-bit digits. Address sequencer 22 successively addresses the various digit locations for reading and writing, as the case may be. Processing element 24 and address sequencer 22 operate in mutual synchronism through interconnection 21. Processing element 24 has an input register 26 for a first digit that may be received as read from memory 20. Furthermore, it has an input register 30 for a second digit through retrocoupling from its result register 28. The latter has an enlarged length with respect to the digit length. A selecting register 32 allows digit-based retrostorage into memory 20. The processing element may execute normalizing, preprocessing and postprocessing as described earlier, and further the standard modular multiplication of the Quisquater, Barrett, and similar non-Montgomery methods. The particular operations are governed through control register 30.

Figure 2:
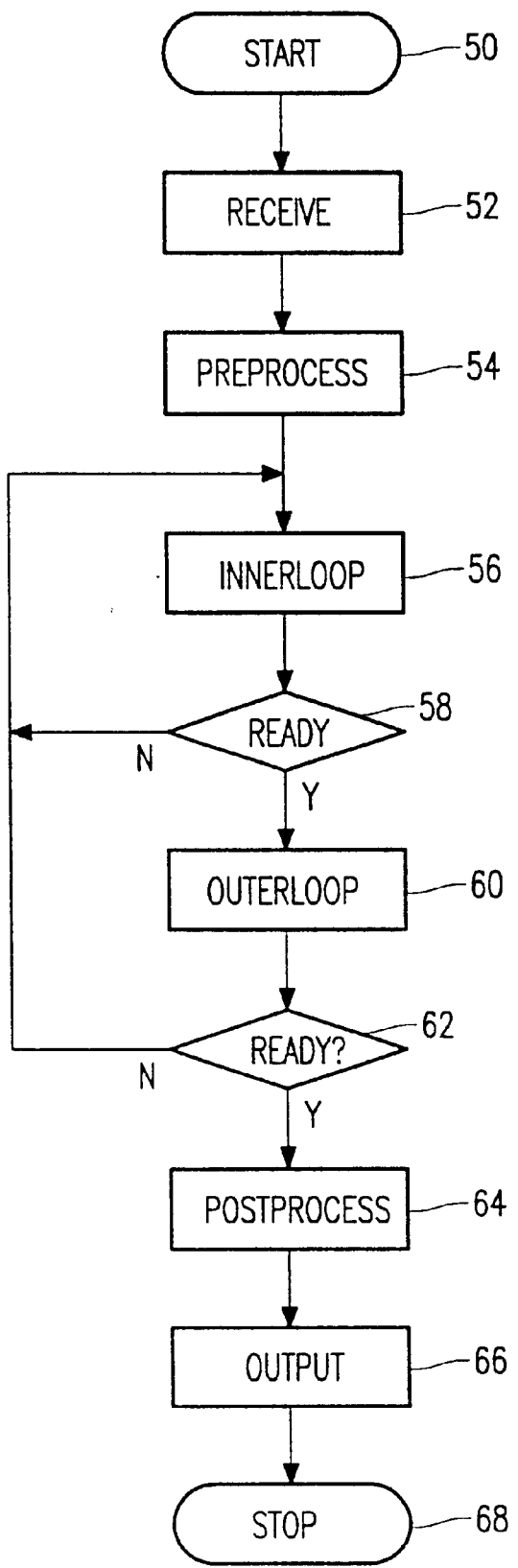
FIG. 2, a flow chart of the invention.

FIG. 2 is a flow chart of the invention. In block 50, the operation is started, which may need claiming of various hardware and software facilities. In block 52, the encrypted message is received. In block 54, the message is preprocessed in the manner described for any applicable algorithm. In block 56, one turn of the inner loop is executed, that calculates an intermediate result on the basis of two b-ary digits. In block 58, the system detects whether the inner loop in question has been executed a sufficient number of times (ready?). If no, the system reverts to block 56. If yes, the system proceeds to block 60 and executes one turn of the outer loop. Subsequently, in block 62, the system detects whether the outer inner loop in question has been executed a sufficient number of times (ready?). If no, the system reverts to block 56 for further executing the inner loop. If yes, the system proceeds to block 64 for postprocessing the final results, and subsequently to block 66 for outputting the result to a user, such as the central processing facility of the smart card in question. The combination of FIGS. 1, 2, in combination with the extensive further disclosure, is deemed to give the skilled are practitioner sufficient teachings as to how to implement the invention.

Summary of the Methods

Input: $\bar{x}$, d, $\overline{M}$, $0 \leq \bar{x}$, d, $\overline{M} < \alpha^{\bar{n}}$. (Typically, α=2). $\bar{x}$ is the encrypted message.

Output: $\bar{z} = <\bar{x}^d>_{\overline{M}}$. First, the standard methods are reviewed.

a. Preprocessing

Quisquater: $x=\bar{x}, n=\bar{n}+p$, $M=c\overline{M}$, where p is some integer and c is chosen such that $\alpha^n - \alpha^{n-p} \leq N < \alpha^n$. This produces a unique choice for c. Also, α=2.

Barrett: $n=\bar{n}$, $M=\overline{M} x=\bar{x}$.

b. Partitioning of d

Write $$d = \sum_{i=0}^{m-1} d_i \beta^i.$$

Typically, β=2 and m=#bits of d.

c. Outer loop z←1 repeat for i=m−1→0:

z←Mult(z, z; M) (if β=2; in general $z \leftarrow <z^\beta>_{M'}$.)

z←Mult(z, x $^{d_i}$; M) (only needed if $d_i > 0$).

endrepeat d. Implementation of modular multiplication in operation Mult

The implementation of z←Mult(u, v; M) assumes $0 \leq u$, v<M, and the result z satisfies $0 \leq z \leq M$.

e. Partitioning
   Write $$v = \sum_{i=0}^{n'-1} v_i B^i,$$

where $B=\alpha^b$ for some integer b. In other words, the n $\alpha$-ary digits of v are grouped in n' blocks of b digits each. (So n=n'b.)

Moreover, Quisquater assumes that $b \leq p-1$; Barrett takes b=n, n'=1.

f. Inner Loop
   z←0
   repeat for i:
   h←z. F+u. $v_i$
   z←R(h)
   endrepeat
   while $z \geq M$ do z←z-M. (17)
   Here, we have the following.
1. i=n'-1→0 in Quisquater and Barrett,
2. F={B=$\alpha^b$ (Quisquater and Barrett)
3.

$$R(h) = \begin{cases} Q(h) := h - \left\lfloor \frac{h}{\alpha^n} \right\rfloor \cdot M, & (Quisquater), \\ B(h) := B_{n-1,n+1}(h) = h - \left\lfloor \left\lfloor \frac{h}{\alpha^{n-1}} \right\rfloor \cdot \left\lfloor \frac{\alpha^{2n}}{M} \right\rfloor / \alpha^{n+1} \right\rfloor \cdot M, & (Barrett) \end{cases}$$

The Barrett reduction operation B used here is a special case of the general Barrett reduction $$B_{k,l}(h) := h - \left\lfloor \left\lfloor \frac{h}{\alpha^k} \right\rfloor \cdot \left\lfloor \frac{\alpha^{k+l}}{M} \right\rfloor / \alpha^l \right\rfloor \cdot M$$

4. In Quisquater and Barrett: $0 \leq w < 3M$ in all steps.
9. Postprocessing
   Here z satisfies $0 \leq z < M$.
   Quisquater: $\bar{z} \leftarrow <z>_{\overline{M}}$.
   Barrett: $\bar{z} \leftarrow z$.

RESUME OF CONDITIONS AND PROPERTIES IN "OLD" ALGORITHMS

Ouisquater
   $p \geq b+1$
Barrett

New Methods a. Preprocessing
   As before, except that for Montgomery we now require more, e.g. that M <R/4. (So n=$\bar{n}$+2 if $\alpha$=2).
b. Partitioning of d
   As before.
c. Outer loop
   As before, but the operation Mult is implemented slightly differently.
d/e. Implementation of modular multiplication in operation Mult Partitioning
   As before, but for Quisquater we now require that $b \leq p-2$.
f. Inner Loop
   As before except that the last instruction "while $z \geq M$ do z←z-M" is removed.

Also, for Barret, instead of taking b=n, n'=1 we allow other values of b, and instead of the special case B=$B_{n-1,n+1}$ we now take B=$B_{k,l}$ for other values of k and l. (For example k=n, l=b+1, or we choose $\alpha$=4 and take e.g. k=n-1, l=b+2 or k=n-2, l=b+4).

g. Postprocessing
   Now we can only guarantee that $\bar{z} < \theta M$ for some $\theta$, typically $\theta$=2 or $\theta$=3. So in case of Barrett, the while statement (17) which was removed from the Loop-part of the operation Mult must now occur here: while $z \geq M$ do z←z-M. For Quisquater, this same operation is also required, but can possibly be combined with the other postprocessing (which does not change).

Resume of Conditions and Properties in "New" Algorithms

Ouisquater
   $p \geq b+2$ (instead of b+1)
Barrett
   Various possible values for the numbers k,l of the Barrett reduction operator $B_{k,l}$. A good condition may be found as follows.
   To compute x.y mod M by Barrett:
   If y=($Y_0 Y_1 \ldots Y_{\lfloor n/r \rfloor - 1}$) each $y_i < b^r$ (b-ary digits) and given $0 \leq x < \alpha M$, $0 \leq z_{i+1},^* \leq \beta M$, we have $(z_i^* - <z_i>_M)/M$ $=(B_{k,l} - <z_i>_M)/M \leq 1 + \max (b^{k-n+1}+(\alpha+\beta)b^{n-1+r-k-l}, b^{k-n}+(\alpha+\beta)b^{n+r-k-l})$ which we need to be $<\theta$. Certainly needed $k+l \geq n+R$ Classical: R=n, k=n-1, l=n+1, then $\beta$=0, $\alpha$=1→$z^*$<3M ($\theta$=3).
   New: R<n, $\alpha$=$\beta$=$\theta$. The condition is 1+max ($b^{k-n+1}$+ $2\theta B^{n-1+r-k-l}$, $B^{k-n}$+$2\theta B^{n+r-k-l}$)<$\theta$ to have all results <$\theta M$.

Better condition:

$$1 + \frac{b^k}{M} + \frac{2\theta M b^r}{b^{k+l}} < \theta$$

for all allowable M.

$$\text{Example } b = 2 \to 1 + \frac{2^k}{M} + \frac{2\theta M 2^r}{2^{k+l}} < \theta$$

$2^{n-1} \leq M < 2^n \to (2^{2-n}+2\theta 2^{n+r-k-l}, 2^{k-n+1}+2\theta 2^{n-1+r-k-l}) < \theta$.

Remark: In both algorithms, these new conditions translate in terms of hardware into the use of slightly larger registers to store various intermediate variables.

What is claimed is:

1. A method for executing a decrypting modular exponentiation modulo M, by digit-wise calculating modular and looped multiplications X*Y mod M, according to a non-Montgomery procedure, with M a temporally steady but instance-wise non-uniform modulus, said method involving an iterative series of steps organized in a loop hierarchy wherein one or two first multiplications are executed to produce a first result, and the loop hierarchy is associated to a reduction of a size of the first result by one or more second multiplications to produce a second result, said method furthermore taking a measure for keeping a final result of such step below a predetermined multiplicity of said modulus, said method postpones a subtraction of the modulus, if needed, as pertaining to said measure to a terminal phase of the modular exponentiation, as being conditional to choosing one or more preprocessing parameters figuring in said method whilst maintaining overall temporal performance of said method.

2. A method as claimed in claim 1, for executing the exponentiation along the Quisquater prescription, whilst choosing the value of the integer p=n−n' not less than p≧b+2.

3. A method as claimed in claim 1, for executing the exponentiation along the Barrett prescription, whilst choosing the value of the numbers k, l, in a suitable manner according to: $1+(b^k/M)+(2\theta M b^R/b^{(k+l)})<\theta$.

4. A device arranged for executing the method as claimed in claim 1.

5. A device as claimed in claim 4, and having enhanced register width for therein storing intermediate results of the exponentiation.

* * * * *